US012609878B2

(12) United States Patent
Ke et al.

(10) Patent No.: US 12,609,878 B2
(45) Date of Patent: Apr. 21, 2026

(54) SELF-DIAGNOSING SYSTEM AND METHOD FOR CONNECTION STATUS OF DEVICES, AND NON-TRANSITORY STORAGE MEDIUM

(71) Applicant: DELTA ELECTRONICS, INC.,
Taoyuan City (TW)

(72) Inventors: Yi-Kuan Ke, Taoyuan City (TW);
Chih-Han Ko, Taoyuan City (TW);
Yi-Kai Tseng, Taoyuan City (TW);
Chia-Ching Lin, Taoyuan City (TW)

(73) Assignee: DELTA ELECTRONICS, INC.,
Taoyuan City (TW)

( * ) Notice: Subject to any disclaimer, the term of this patent is extended or adjusted under 35 U.S.C. 154(b) by 41 days.

(21) Appl. No.: 18/655,267

(22) Filed: May 5, 2024

(65) Prior Publication Data

US 2025/0158905 A1 May 15, 2025

Related U.S. Application Data

(60) Provisional application No. 63/599,317, filed on Nov. 15, 2023.

(30) Foreign Application Priority Data

Jan. 22, 2024 (CN) .......................... 202410088665.6

(51) Int. Cl.
*H04L 43/0811* (2022.01)
*H04L 43/10* (2022.01)

(52) U.S. Cl.
CPC .......... *H04L 43/0811* (2013.01); *H04L 43/10* (2013.01)

(58) Field of Classification Search
CPC ..................... H04L 43/045; H04L 43/062065
See application file for complete search history.

(56) References Cited

U.S. PATENT DOCUMENTS 6,061,723 A * 5/2000 Walker .................... H04L 41/12
709/224
7,340,543 B2 * 3/2008 Benninger ....... G07B 17/00467
710/63

(Continued)

FOREIGN PATENT DOCUMENTS

CN 102624099 B 6/2014
CN 207926618 U 9/2018

(Continued)

OTHER PUBLICATIONS

Search Report dated Oct. 17, 2024 of the corresponding European patent application No. 24174282.4.

(Continued)

*Primary Examiner* — Jerry B Dennison
(74) *Attorney, Agent, or Firm* — HDLS IPR SERVICES;
Chun-Ming Shih

(57) ABSTRACT

A self-diagnosing system including a communication diagnosing model, a device communication-status identification model, a communication-line identification model, and a graphic updating model is disclosed. The communication diagnosing model determines whether device data of each peripheral device is received. The device communication-status identification model identifies the communication-line of the peripheral device to be normal when the device data is received and determines whether a connection status of the peripheral device is a first category or a second category based on a target data. The communication-line identification model identifies the peripheral device to be offline when the device data is not received and inspects the communication-line of the peripheral device to determine whether the connection status of the peripheral device is the second category or a third category. The graphic updating model (Continued)

updates a displaying icon of each peripheral device based on the connection status of each peripheral device.

10 Claims, 10 Drawing Sheets

(56)                    References Cited

U.S. PATENT DOCUMENTS

| | | | | |
|---|---|---|---|---|
| 8,839,402 | B1* | 9/2014 | Hughes | H04L 43/026 |
| | | | | 709/224 |
| 9,258,195 | B1* | 2/2016 | Pendleton | H04L 67/75 |
| 11,025,483 | B1* | 6/2021 | Hashmi | H04L 63/164 |
| 2002/0147809 | A1* | 10/2002 | Vinberg | H04L 41/046 |
| | | | | 709/224 |
| 2004/0039638 | A1* | 2/2004 | Moriyama | G06Q 30/0207 |
| | | | | 705/14.1 |
| 2008/0101258 | A1* | 5/2008 | Cheng | H04L 12/66 |
| | | | | 370/254 |
| 2011/0173354 | A1* | 7/2011 | Hall | G06F 11/3006 |
| | | | | 710/58 |
| 2013/0003111 | A1 | 1/2013 | Mitsubori | |
| 2014/0280920 | A1* | 9/2014 | Foley | H04L 43/0817 |
| | | | | 709/224 |
| 2014/0379898 | A1 | 12/2014 | Schmit et al. | |
| 2017/0126541 | A1* | 5/2017 | Maness | H04L 43/0817 |
| 2017/0149643 | A1* | 5/2017 | Purushothaman | H04L 41/0661 |
| 2018/0288096 | A1* | 10/2018 | Cullari | H04L 63/102 |
| 2019/0000557 | A1* | 1/2019 | Govari | A61B 18/1492 |
| 2020/0084088 | A1* | 3/2020 | Zhu | H04L 41/0659 |
| 2020/0204456 | A1* | 6/2020 | Hu | H04L 41/12 |
| 2021/0021492 | A1* | 1/2021 | Gao | H04L 41/22 |
| 2023/0283514 | A1* | 9/2023 | Jea | H04L 41/0654 |
| | | | | 709/224 |
| 2024/0193254 | A1* | 6/2024 | Bealby | G06F 21/44 |
| 2025/0039069 | A1* | 1/2025 | Ito | H04L 41/12 |
| 2025/0077333 | A1* | 3/2025 | Catalano | G06F 11/0709 |
| 2025/0158905 | A1* | 5/2025 | Ke | H04L 43/10 |
| 2025/0220030 | A1* | 7/2025 | Cheng | H04L 63/1425 |
| 2025/0267195 | A1* | 8/2025 | Seed | H04L 41/0894 |

FOREIGN PATENT DOCUMENTS

| | | |
|---|---|---|
| CN | 115327278 A | 11/2022 |
| TW | I323103 B | 4/2010 |
| TW | M612500 U | 6/2021 |
| TW | 202218909 A | 5/2022 |

OTHER PUBLICATIONS

Office Action dated Dec. 6, 2024 of the corresponding Taiwan patent application No. 113102403.

* cited by examiner

SELF-DIAGNOSING SYSTEM AND METHOD FOR CONNECTION STATUS OF DEVICES, AND NON-TRANSITORY STORAGE MEDIUM

CROSS-REFERENCE TO RELATED APPLICATION

This patent application claims the benefit of U.S. Provisional Patent Application No. 63/599,317, filed Nov. 15, 2023, which is incorporated by reference herein.

BACKGROUND OF THE DISCLOSURE

Technical Field

The disclosure relates to smart grid field, and particularly to a system and a method for diagnosing the connection status of the peripheral devices in the smart grid.

Description of Related Art

Recently, the use of the smart grid becomes popular. In general, the smart grid designs the power system in layers based on its functionality, and the smart grid includes multiple functions such as real-time information monitoring, data analysis, and prediction management, etc.

According to the enlarged use of the smart grid, new functions are required in the market to assist the smart grid, so that the smart grid can become even smarter to satisfy the increasing demands from the user. However, there still lacks effective approaches and systems that can use real-time communication data to determine the connection status of each peripheral device of the system and display the same in a visual manner in real-time. In conclusion, it is hard for the user to be notified with the connection status of the peripheral devices in the first place, so the difficulty of maintaining the same is hard to be concurred.

SUMMARY OF THE DISCLOSURE

The present disclosure is directed to a self-diagnosing system and method for connection status of devices, and non-transitory storage medium, which may automatically diagnose the connection status of the peripheral devices being connected and display the same in visual manner in real-time.

In one of the exemplary embodiments, the self-diagnosing system for connection status of devices of the present disclosure is connected with multiple peripheral devices for communication in an environment, and includes:

a graphic control page;

a communication diagnosing model, configured to determine whether a device data of each of the peripheral device is received;

a device communication-status identification model, configured to identify that a communication-line of a first device of the multiple peripheral devices is normal when the device data of the first device is received, and determine whether a connection status of the first device is a first category or a second category according to a target data relevant to connectivity of the first device, wherein the first category indicates that the communication-line of the first device and a device connection of the first device are normal and the second category indicates that the communication-line of the first device is normal but the device connection of the first device is abnormal;

a communication-line identification model, configured to identify that a second device of the multiple peripheral devices is offline when the device data of the second device is not received, and determine whether the connection status of the second device is the second category or a third category through inspecting the communication-line of the second device, wherein the third category indicates that the communication-line of the second device and the device connection of the second device are abnormal; and a graphic updating model, configured to update a displaying icon of each of the peripheral devices on the graphic control page based on the connection status of each of the peripheral devices.

In one of the exemplary embodiments, the self-diagnosing method for connection status of devices of the present disclosure is incorporated with a self-diagnosing system that is connected with multiple peripheral devices for communication in an environment, and the self-diagnosing method includes following steps:

step a) determining, by the self-diagnosing system, whether receiving a device data of each of the peripheral devices;

step b) identifying, by the self-diagnosing system, that a communication-line of a first device of the multiple peripheral devices is normal when the device data of the first device is received;

step b1) after the step b), determining whether a connection status of the first device is a first category or a second category according to a target data relevant to connectivity of the first device, wherein the first category indicates that the communication-line of the first device and a device connection of the first device are normal and the second category indicates that the communication-line of the first device is normal but the device connection of the first device is abnormal;

step c) identifying, by the self-diagnosing system, that a second device of the multiple peripheral devices is offline when the device data of the second device is not received;

step c1) after the step c), determining whether the connection status of the second device is the second category or a third category through inspecting the communication-line of the second device, wherein the third category indicates that the communication-line of the second device and the device connection of the second device are abnormal; and step d) updating, by the self-diagnosing system, a displaying icon of each of the peripheral devices on the graphic control page based on the connection status of each of the peripheral devices.

In one of the exemplary embodiments, the non-transitory storage medium of the present disclosure stores an application program, the application program includes multiple computer-executable program codes, and the multiple computer-executable program codes are executed to implement each specific step of the self-diagnosing method of the present disclosure.

In comparison with the related art, the present disclosure diagnoses, immediately when an abnormal connection occurs, whether the reason causing the abnormal is the problem of the peripheral device itself or the problem of the communication-line. Therefore, it is ease for the user to eliminate the faulty and maintain the device. Besides, the present disclosure displays the diagnosis result in a visual manner in real-time, so that the user can detect the existence of the faulty in the first place and know exactly whether the peripheral device itself should be tested or the communication-line used for connection should be tested.

DETAILED DESCRIPTION

The present disclosure discloses a self-diagnosing system for connection status of devices (referred to as the diagnosing system hereinafter), which is connected with one or more peripheral devices through a wired manner or a wireless manner, and the diagnosing system receives data of these devices to perform a self-diagnosing procedure to determine whether the devices themselves are abnormal and whether the communications between the devices and the diagnosing system are abnormal.

Figure 1:
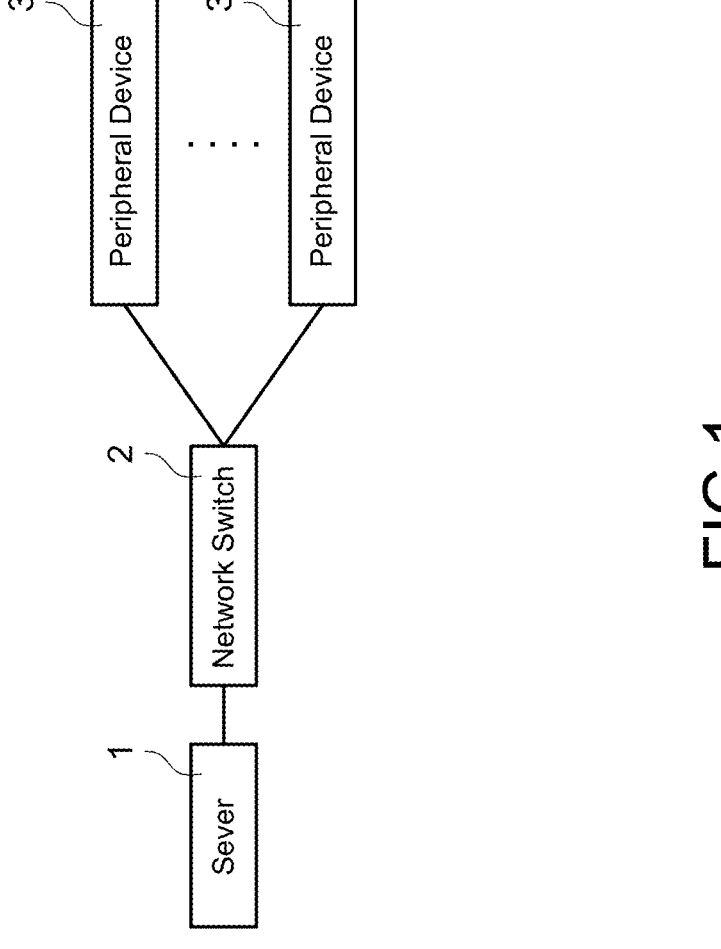
FIG. 1 is a schematic diagram showing the system connection of the present disclosure.

Please refer to FIG. 1, which is a schematic diagram showing the system connection of the present disclosure. The diagnosing system of the present disclosure is implemented in a server 1 through a combination of software and hardware. As shown in FIG. 1, the server 1 communicates and connects with a network switch 2, and the network switch 2 connects with multiple peripheral devices 3 in a field. Therefore, the server 1 can connect with the multiple peripheral devices 3 in the field through the network switch 2 and receive device data of the peripheral devices 3 to perform the self-diagnosing procedure.

Figure 2:
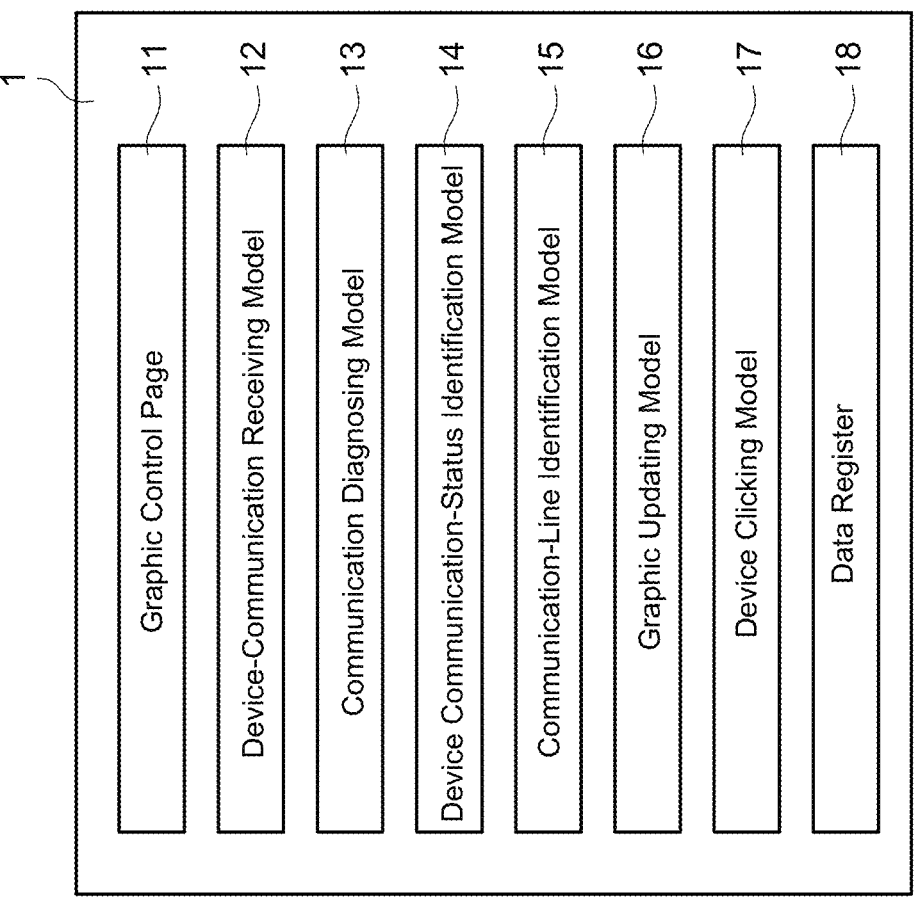
FIG. 2 is a block diagram of a diagnosing system of the present disclosure.
Figure 3A:
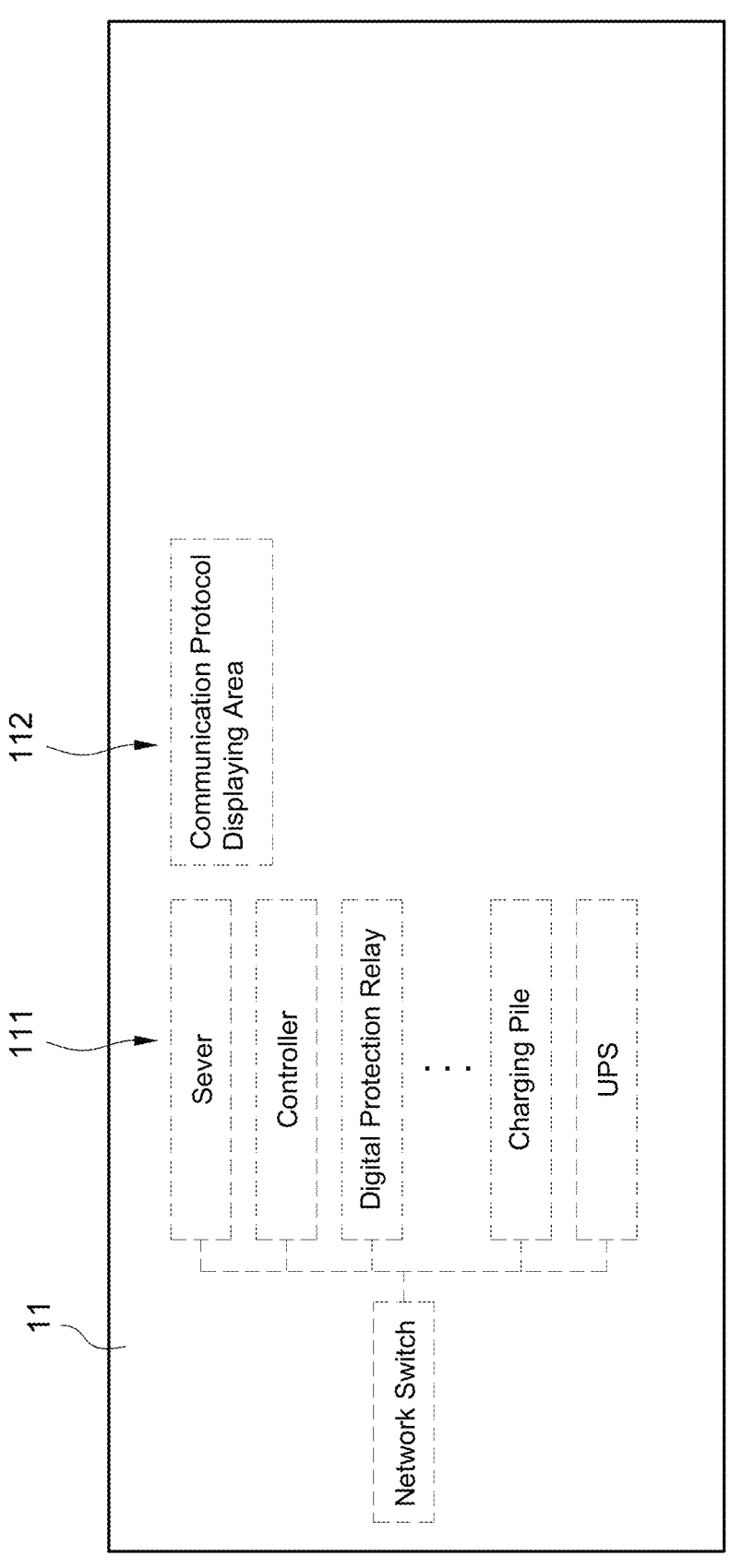
FIG. 3A is a first schematic diagram showing a graphic control page of the present disclosure.
Figure 3B:
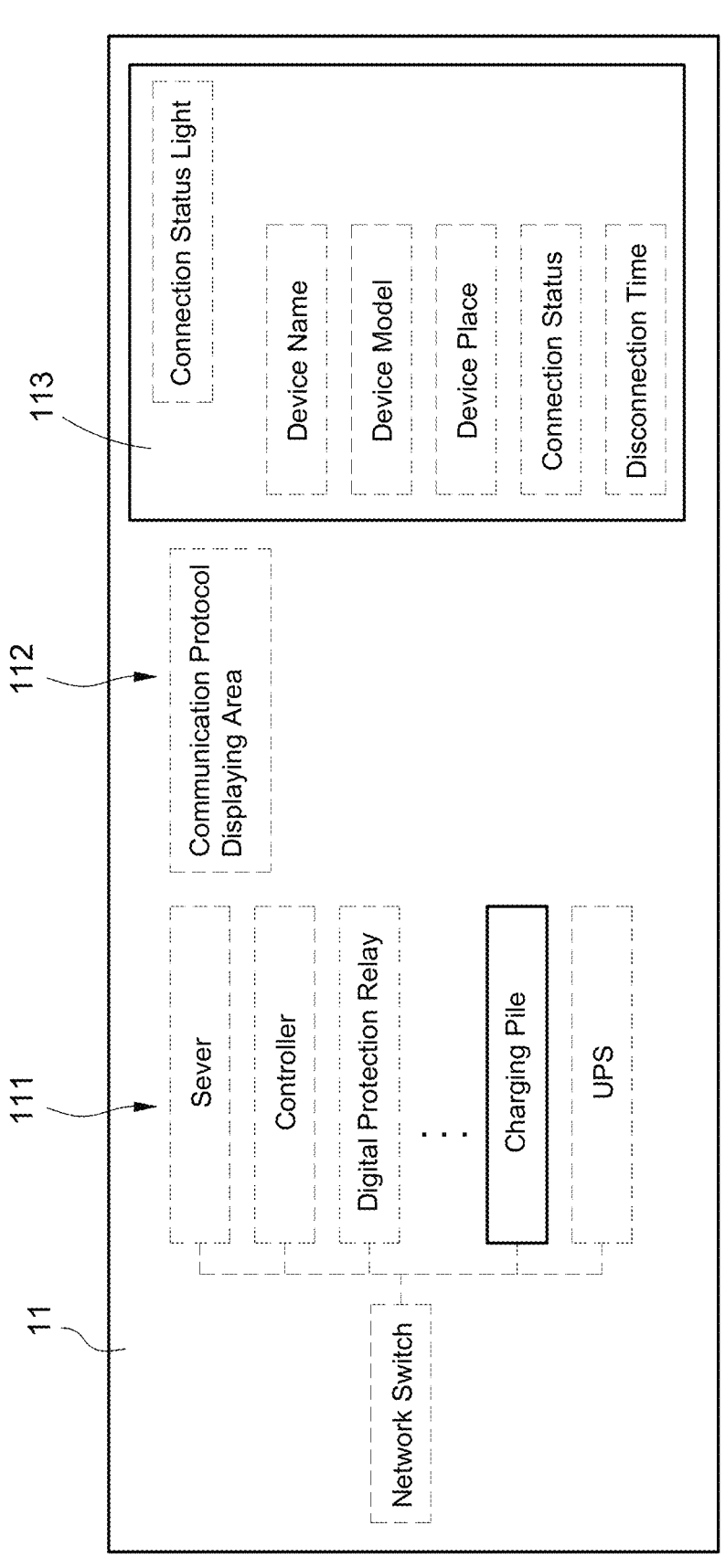
FIG. 3B is a second schematic diagram showing the graphic control page of the present disclosure.

In an embodiment, the multiple peripheral devices 3 include each type of electronic devices in a smart grid, such as digital electricity meters, digital protection relays, phasor measurement units (PMUs), PV inverters, bidirectional inverters, battery management systems, uninterruptible power supplies (UPSs), charging piles, generators, and loads, etc. The network switch 2 communicates with different peripheral devices 3 through different communication protocols, such as Modbus, IEC61850, the Ethernet, or CAN bus, etc. In the present disclosure, the diagnosing system provides at least one graphic control page (such as the graphic control page 11 as shown in FIG. 2, FIG. 3A, and FIG. 3B) through the server 1. One technical feature of the present disclosure is that, after the diagnosing system completes the self-diagnosing procedure, it may display the diagnosing result in a visual manner on the graphic control page 11 in real-time, so that the user can immediately realize the abnormal of the peripheral device(s) and proceed to maintain or replace the abnormal one.

Please also refer to FIG. 2, where FIG. 2 is a block diagram of a diagnosing system of the present disclosure. As shown in FIG. 2, the diagnosing system of the present disclosure is implemented by the server 1 that includes the graphic control page 11, a device-communication receiving model 12, a communication diagnosing model 13, a device communication-status identification model 14, a communication-line identification model 15, a graphic updating model 16, a device clicking model 17, and a data register 18. In particular, the server 1 of the present disclosure includes a non-transitory storage medium such as a memory, a hard-drive, or a compact disc, etc. The non-transitory storage medium is utilized to store an application program, the application program includes multiple computer-executable program codes. When executing the multiple computer-executable program codes, the server 1 may virtually create the graphic control page 11 and the models 12-17 inside of the server 1. Therefore, the server 1 may implement the connection status self-diagnosing method (referred to as the diagnosing method) of the present disclosure via using the graphic control page 11, the models 12-17, and the data register 18 (being implemented by either software or hardware).

The graphic control page 11 is configured to display the connection structure of all devices in the field (for example, the network switch 2 and the multiple peripheral devices 3 connected therewith) where the diagnosing system is located. The device-communication receiving model 12 is configured to receive device data of each peripheral device 3 in the field. The communication diagnosing model 13 is configured to decide how to activate a communication diagnosing procedure based on the device data received from each peripheral device 3. The device communication-status identification model 14 is configured to identify whether the peripheral devices 3 themselves are abnormal. The communication-line identification model 15 is configured to identify whether the communication-lines either between each peripheral device 3 and the server 1 or between each peripheral device 3 and the network switch 2 are abnormal. The graphic updating model 16 is configured to update the displaying content of the graphic control page 11 based on the status of each peripheral device 3 itself and the status of the communication-lines. The device clicking model 17 is configured to detect whether a graphic control component of each peripheral device 3 displayed on the graphic control page 11 is clicked. The data register 18 is configured to temporarily store the diagnosing result generated by the diagnosing system.

Please also refer to FIG. 3A and FIG. 3B, wherein FIG. 3A is a first schematic diagram showing a graphic control page of the present disclosure and FIG. 3B is a second schematic diagram showing the graphic control page of the present disclosure.

The graphic control page 11 includes an information card displaying area 113. As shown in FIG. 3B, the graphic control page 11 displays multiple graphic control components of multiple peripheral devices in the current field. As discussed above, the device clicking model 17 of the diagnosing system detects whether each of the graphic control components is clicked (i.e., a user clicks a certain graphic control component through using the human-machine interface (HMI) of the server 1). When the device clicking model 17 detects any graphic control component corresponding to a certain peripheral device being clicked, the device clicking model 17 triggers the graphic control page 11 to display the information card displaying area 113. In the present disclosure, the graphic control page 11 obtains the device data corresponding to the peripheral device being clicked and displays the device data on the information card displaying area 113. In one embodiment, the information card displaying area 113 may display the connection status light (e.g., green light for the connection status being CONNECTED and red light for the connection status being DISCONNECTED), the basic data (e.g., device name, device model, and device place, etc.), the connection status (e.g., connected or disconnected), and the disconnection time, etc. of the peripheral device being clicked. However, the above description is only an exemplary embodiment of the present disclosure, but not limited thereto.

One technical feature of the present disclosure is that, the graphic control page 11 displays all the peripheral devices in the field and the communication protocols used by these peripheral devices on the connection structure displaying area 111 and the communication protocol displaying area 112. Besides, when any peripheral device or communication-line is diagnosed to be abnormal, the graphic control page 11 displays the abnormal information. In sum, the usage of the graphic control page 11 is ease for the user of the smart grid to immediately realize an abnormal situation and proceed to maintain the peripheral devices and the communication-lines.

Figure 4:
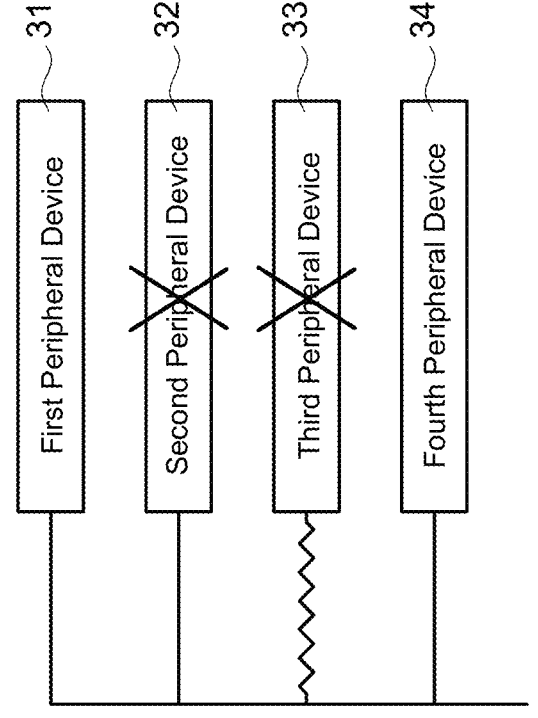
FIG. 4 is a schematic diagram showing a diagnosing result of the present disclosure.

Please refer to FIG. 4, which is a schematic diagram showing a diagnosing result of the present disclosure. In the present disclosure, the graphic control page 11 as shown in FIG. 3A or FIG. 3B can utilize different colors, pictures, or symbols to represent different status of the communication-line. The displaying result of the graphic control page 11 is exampled in FIG. 4. Additionally, the graphic control page 11 may use a special symbol to mark the abnormal of the peripheral device itself (i.e., the device connection of the peripheral device itself is abnormal). In the embodiment of FIG. 4, the graphic control page 11 uses a special picture and a special symbol (i.e., the X symbol) to represent that the communication-line and the device connection of a first peripheral device 31 are normal, the communication-line of a second peripheral device 32 is normal but the device connection of the second peripheral device 32 is abnormal, the communication-line and the device connection of a third peripheral device 33 are abnormal, and the communication-line and the device connection of a fourth peripheral device 34 are normal.

When the user sees the displaying result as shown in FIG. 4 on the graphic control page 11 as shown in FIG. 3A, the user may click the graphic control component of one of the peripheral devices to be inspected (such as the third peripheral device 33) through the HMI of the server 1. Therefore, as shown in FIG. 3B, the graphic control page 11 triggers the information card displaying area 113 to detailed display the device data of the third peripheral device 33 for the user, so the user may proceed maintenance for the third peripheral device 33.

Figure 5A:
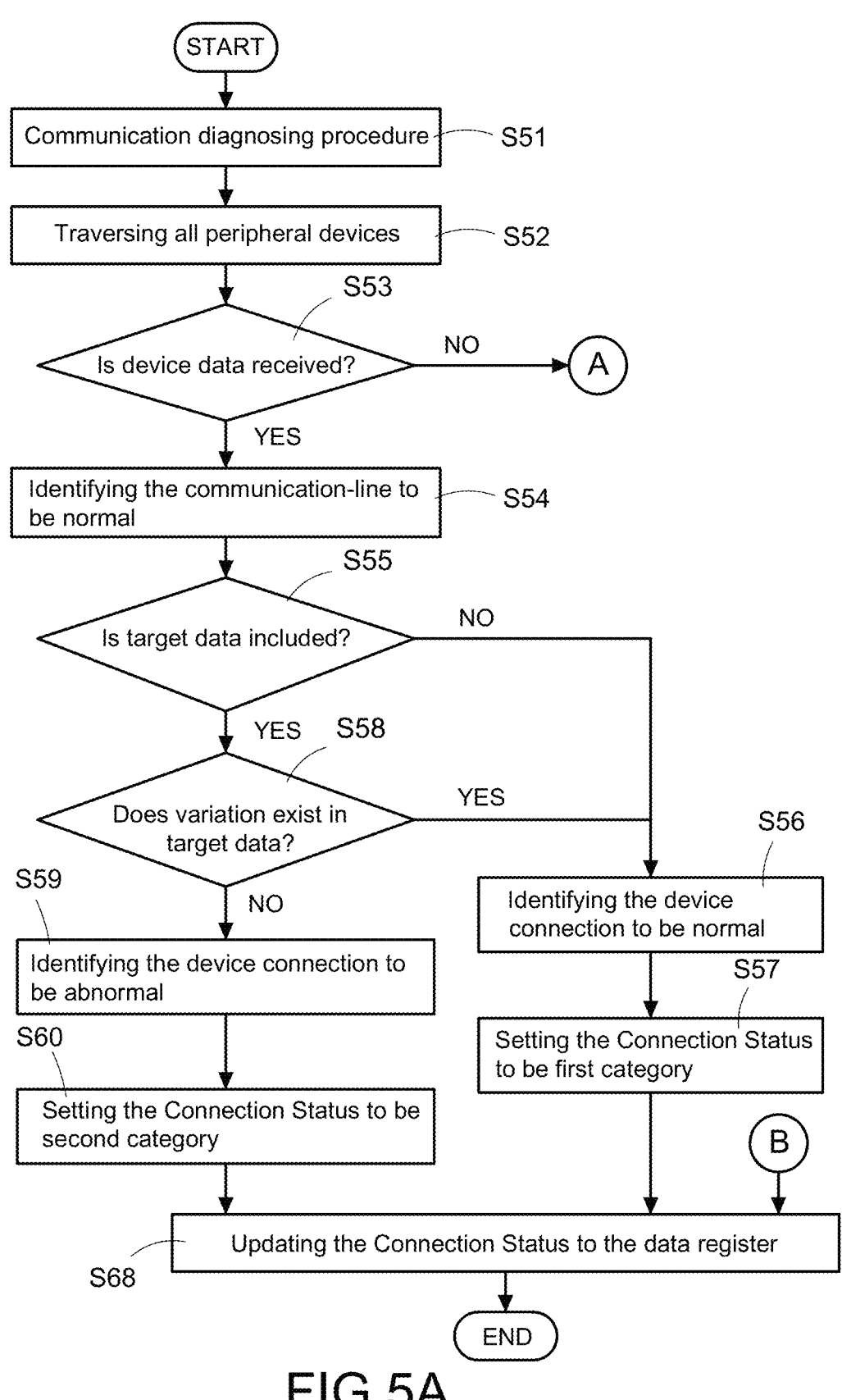
FIG. 5A is a first part of a flowchart for diagnosing of the present disclosure.
Figure 5B:
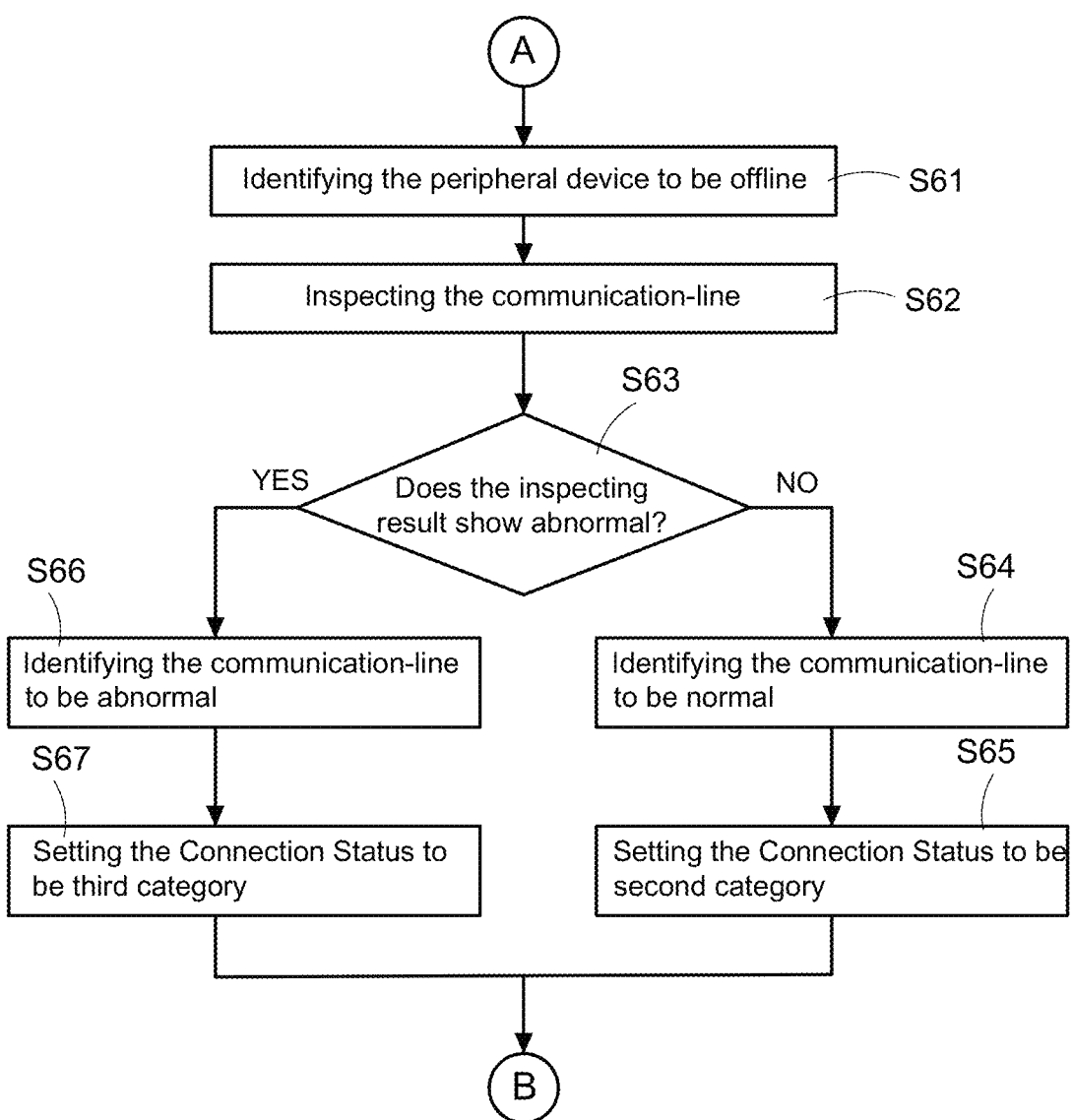
FIG. 5B is a second part of a flowchart for diagnosing of the present disclosure.

Please refer to FIG. 5A and FIG. 5B, which are a flowchart for diagnosing of the present disclosure. FIG. 5A and FIG. 5B disclose the specific executing steps of the diagnosing method of the present disclosure, wherein the diagnosing method is implemented by the diagnosing system as shown in FIG. 1 and FIG. 2. First, the diagnosing system triggers the communication diagnosing procedure (step S51). In a first embodiment, the diagnosing system automatically triggers the communication diagnosing procedure after the server 1 is activated. In a second embodiment, the diagnosing system triggers the communication diagnosing procedure upon receiving an external trigger (for example, after the application program installed in the server 1 is executed). In a third embodiment, the diagnosing system triggers the communication diagnosing procedure when the server 1 starts receiving the device data of the one or more peripheral devices through the network switch 2.

Next, the diagnosing system traverses all the connected peripheral devices 3 (step S52) and determines whether the device data of each of the peripheral devices 3 is received (step S53). In one embodiment, the diagnosing system sends an inquiring command to all the connected peripheral devices 3 through the device-communication receiving model 12 and then receives reply packets sent from each peripheral device 3 in response to the inquiring command, wherein the reply packets may include the device data of each peripheral device 3. Besides, the diagnosing system determines whether the response from each peripheral device 3 is received by the communication diagnosing model 13. In other words, the diagnosing system determines whether the device data of each peripheral device 3 is received through the communication diagnosing model 13.

One technical feature of the present disclosure is that, if the diagnosing system successfully receives device data of one peripheral device 3, the communication-line between the diagnosing system and this peripheral device 3 is represented as normal, and thus the follow-up check for the connection status of the peripheral device 3 itself is required. If the device data of any of the peripheral devices 3 cannot be received by the diagnosing system for a while, the connection status of the peripheral device 3 itself is represented as abnormal, and thus the follow-up check for the communication-line between the diagnosing system and the peripheral device 3 is required.

Particularly, if the diagnosing system successfully receives the device data replied from any of the peripheral device (such as a first peripheral device 31), the diagnosing system confirms that the communication-line between the first peripheral device 31 and the network switch 2 is normal and further determines whether the connection status of the first peripheral device 31 itself is normal. If the diagnosing system fails to receive the device data replied from any of the peripheral devices (such as a second peripheral device 32), the diagnosing system confirms that the second peripheral device 32 itself is abnormal (i.e., the second peripheral device 32 is offline) and further diagnoses whether the communication-line between the second peripheral device 32 and the network switch 2 is normal.

As shown in FIG. 5A, if the communication diagnosing model 13 determines in the step S53 that the device data of the first peripheral device 31 is successfully received, the diagnosing system directly identifies the communication-line of the first peripheral device 31 to be normal through the device communication-status identification model 14 (step S54). Next, the device communication-status identification model 14 retrieves a target data relevant to the connectivity from the device data of the first peripheral device 31 and determines the connection status of the first peripheral device 31 based on the target data. In one embodiment, the connection status of the peripheral devices 3 includes a first category indicating that the communication-line and the device connection of the peripheral devices 3 are normal, a second category indicating that the communication-line of the peripheral devices 3 is normal but the device connection of the peripheral devices 3 is abnormal, and a third category indicating that the communication-line and the device connection of the peripheral devices 3 are abnormal. The present disclosure displays the diagnosing results with at least three different categories directly and immediately through a visual manner. As a result, the user may quickly and clearly know the current connection status of each peripheral device 3. Whenever a peripheral device 3 becomes abnormal, the user may quickly and clearly find out the occurring place and occurring reason of the faulty of the abnormal device.

Particularly, after identifying the communication-line of the first peripheral device 31 to be normal in the step S54, the device communication-status identification model 14 further analyze the device data of the first peripheral device 31 in accordance with the communication protocol of the first peripheral device 31 to determine whether the device data of the first peripheral device 31 includes the target data that is relevant to the connectivity (step S55). In one of the exemplary embodiments, if no target data relevant to the connectivity is determined, in accordance with the communication protocol, to be included in the device data of the first peripheral device 31, the device communication-status identification model 14 directly identifies the device connection of the first peripheral device 31 to be normal (step S56) and sets the connection status of the first peripheral device 31 to be the first category (step S57).

In one of the exemplary embodiments, if the target data relevant to the connectivity is determined, in accordance with the communication protocol, to be included in the device data of the first peripheral device 31, the device communication-status identification model 14 further determines whether a variation exists in the target data (step S58). Particularly, the target data can be, for example but not limited to, a heartbeat of the first peripheral device 31 or a designated bit in a designated data point of the first peripheral device 31, etc. If a variation exists in the target data (for example, the target data changes overtime in a standard), it represents that the first peripheral device 31 operates continuously and the diagnosing system can receive the device data continuously. In the meantime, the device communication-status identification model 14 identifies the device connection of the first peripheral device 31 to be normal (step S56) and sets the connection status of the first peripheral device 31 to be the first category (step S57). If no variation is determined to be included in the target data in the step S58, the device communication-status identification model 14 identifies the device connection of the first peripheral device 31 to be abnormal (i.e., the first peripheral device 31 is offline) (step S59) and sets the connection status of the first peripheral device 31 to be the second category (step S60).

If the communication diagnosing model 13 determines, in the step S53, that the device data of a second peripheral device 32 cannot be received, the diagnosing system directly identifies the second peripheral device 32 to be offline through the communication-line identification model 15 (step S61), in other words, identifies the connection of the second peripheral device 32 to be abnormal. Next, the communication-line identification model 15, under the confirmation that the second peripheral device 32 is abnormal, further inspects the communication-line between the second peripheral device 32 and the network switch 2 (step S62) and determines the connection status of the second peripheral device 32 based on an inspecting result.

Particularly, after identifying the second peripheral device 32 to be offline in the step S61, the communication-line identification model 15 further inspects the pins of the second peripheral device 32 in accordance with the communication protocol of the second peripheral device 32 or reads the status of the communication ports of the second peripheral device 32 through the network switch 2 that is connected with the second peripheral device 32, so as to inspect whether the communication-line of the second peripheral device 32 is abnormal (step S63). In one embodiment, if the inspecting result shows a normal status (i.e., a negative result is determined in the step S63), the communication-line identification model 15 identifies the communication-line of the second peripheral device 32 to be normal (step S64) and sets the connection status of the second peripheral device 32 to be the second category (step S65). If the inspecting result shows an abnormal status (i.e., a positive result is determined in the step S63), the communication-line identification model 15 identifies the communication-line of the second peripheral device 32 to be abnormal (step S66) and sets the connection status of the second peripheral device 32 to be the third category (step S67).

In the present disclosure, the diagnosing system diagnoses all the peripheral devices 3 that are currently connected with the diagnosing system (e.g., all the peripheral devices 3 shown on the graphic control page 11) through the steps shown in FIG. 5A and FIG. 5B. In other words, the diagnosing system executes each step in FIG. 5A and FIG. 5B respectively for every connected peripheral device 3 therewith and respectively sets the connection status correspondingly for each of the peripheral devices 3 (either belongs to the first category, the second category, or the third category). In one of the exemplary embodiments, the user may set an update rate for the diagnosing system, such as every 100 millisecond, every 500 millisecond, or every 1 second, etc., but not limited thereto. Therefore, based on the update rate, the diagnosing system sends the inquiring command to each of the peripheral device 3, diagnoses each peripheral device 3, sets or updates the connection status for each peripheral device 3 in accordance with its diagnosing result, and records or updates the connection status to the data register 18 (step S68).

In the present disclosure, the device communication-status identification model 14 writes the connection status to the data register 18 after identifying the connection status of the peripheral device 3 to be the first category or the second category. Similarly, the communication-line identification model 15 writes the connection status to the data register 18 after identifying the connection status of the peripheral device 3 to be the second category or the third category. In the present disclosure, the graphic updating model 16 reads the newest connection status of each peripheral device 3 from the data register 18 based on the update rate and then updates the displaying icon of each peripheral device 3 on the graphic control page 11 based on the newest connection status being read. In one of the exemplary embodiments, the update rate the device communication-status identification model 14 and the communication-line identification model 15 update the data register 18 is synchronized with the update rate the graphic updating model 16 updates the graphic control page 11. For example, the data register 18 and the graphic control page 11 can be updated simultaneously through pipeline technology. In another embodiment, it is unnecessary to synchronize the update rate the device communication-status identification model 14 and the communication-line identification model 15 update the data register 18 and the update rate the graphic updating model 16 updates the graphic control page 11.

Figure 6:
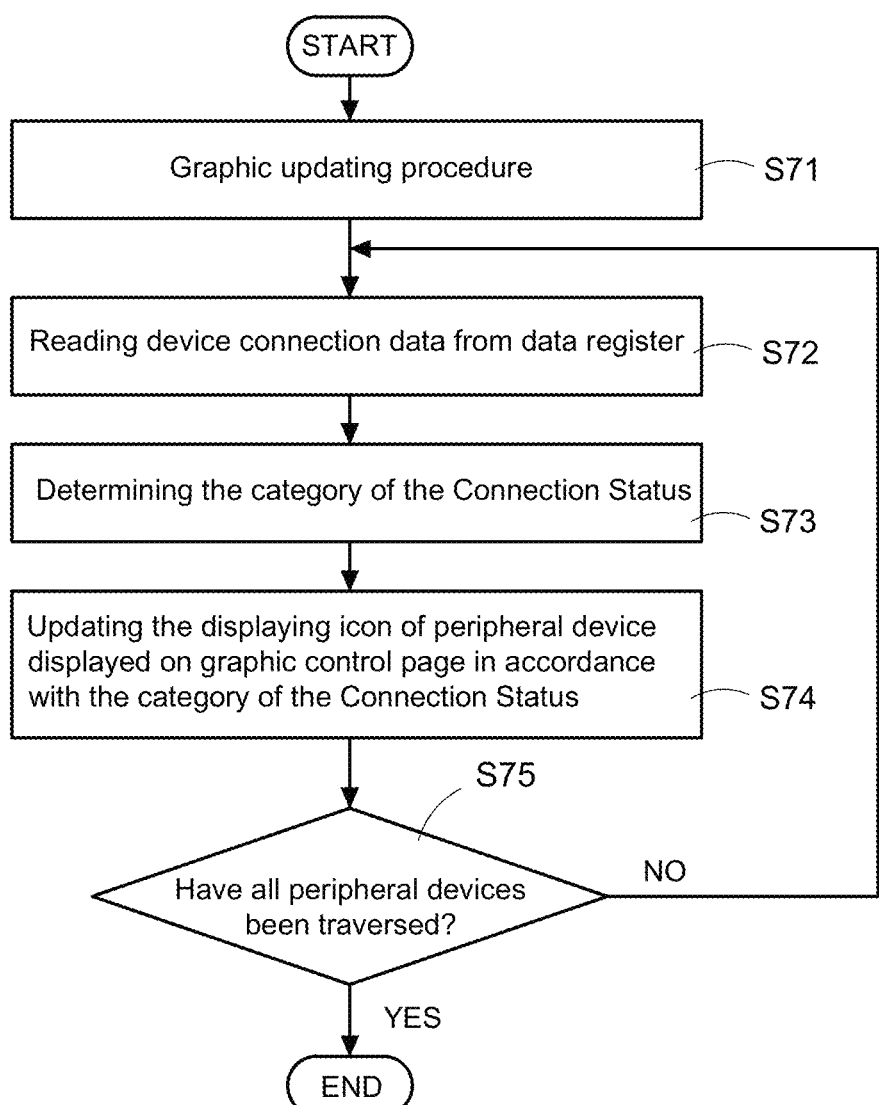
FIG. 6 is a flowchart for graphic updating of the present disclosure.

Please refer to FIG. 6, which is a flowchart for graphic updating of the present disclosure. As disclosed in FIG. 6, the diagnosing system utilizes the graphic updating model

16 to trigger a graphic updating procedure based on a pre-determined update rate (step S71). During the graphic updating procedure, the graphic updating model 16 reads stored data (i.e., device connection data) of one of the peripheral devices 3 that are currently connected with the diagnosing system from the data register 18 (step S72), and determines the connection status of this peripheral device 3 based on the stored data being read (step S73). The connection status is, for example, the aforementioned first category, second category, and third category. After the step S73, the graphic updating model 16 updates the displaying icon displayed on the graphic control page 11 in accordance with the connection status of this peripheral device 3 (step S74).

For example, if the connection status of a first peripheral device is the first category (i.e., the communication-line and the device connection of the first peripheral device are normal), the graphic updating model 16 updates the displaying icon of the first peripheral device on the graphic control page 11, wherein the graphic control page 11 is updated to display the normal communication-line between the first peripheral device and the network switch 2 by a first color (e.g., blue) or a first streak line (e.g., a solid line) and do not display the special symbol representing the abnormal device connection on the graphic control component of the first peripheral device. If the connection status of a second peripheral device is the second category (i.e., the communication-line of the second peripheral device is normal but the device connection of the second peripheral device is abnormal), the graphic updating model 16 updates the displaying icon of the second peripheral device on the graphic control page 11, wherein the graphic control page 11 is updated to display the normal communication-line between the second peripheral device and the network switch 2 by the first color (e.g., blue) or the first streak line (e.g., a solid line) and display the special symbol (such as the X symbol) representing the abnormal device connection on the graphic control component of the second peripheral device. For another example, if the connection status of a third peripheral device is the third category (i.e., the communication-line and the device connection of the third peripheral device are abnormal), the graphic updating model 16 updates the displaying icon of the third peripheral device on the graphic control page 11, wherein the graphic control page 11 is updated to display the abnormal communication-line between the third peripheral device and the network switch 2 by a second color (e.g., grey) or a second streak line (e.g., a dotted line) and display the special symbol representing the abnormal device connection on the graphic control component of the third peripheral device.

Via utilizing the above technical features, the graphic updating model 16 may update the graphic control page 11 in real-time in accordance with the data stored in the data register 18, so the user can realize the current connection status of each peripheral device 3 in the first place.

After the step S74, the graphic updating model 16 determines whether all the peripheral devices 3 that are currently connected with the diagnosing system are traversed (step S75). If the graphic updating model 16 has not traversed all the peripheral devices 3 yet, it re-executes the step S72 through the step S74 to obtain the data of next peripheral device 3 from the data register 18 and update the displaying icon of the next peripheral device 3 on the graphic control page 11. After all the peripheral devices 3 are traversed, the graphic updating model 16 temporarily terminates the graphic updating procedure and waits for triggering the next graphic updating procedure in accordance with the update rate.

Figure 7:
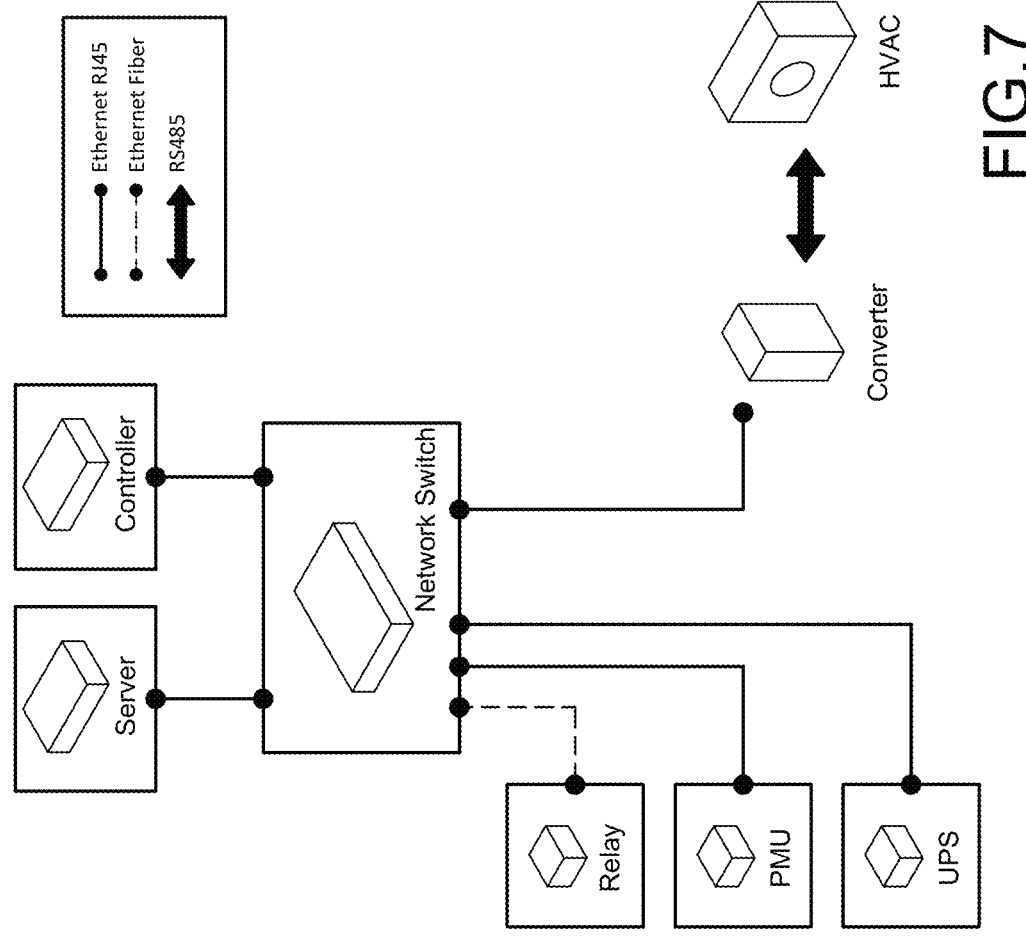
FIG. 7 is a third schematic diagram of the graphic control page of the present disclosure.
Figure 8:
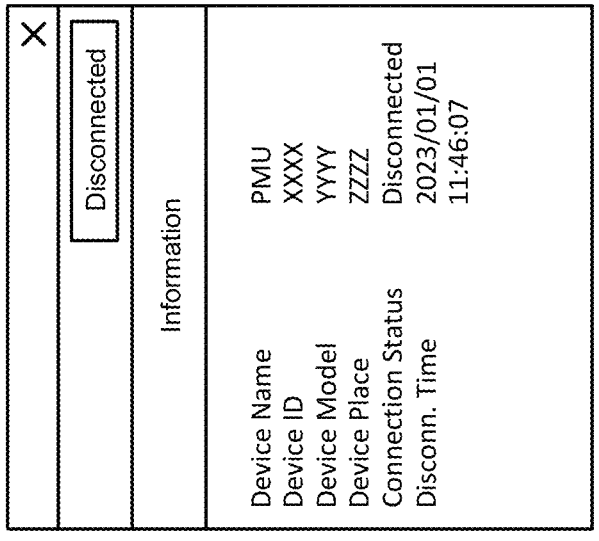
FIG. 8 is a fourth schematic diagram of the graphic control page of the present disclosure.
Figure 8:
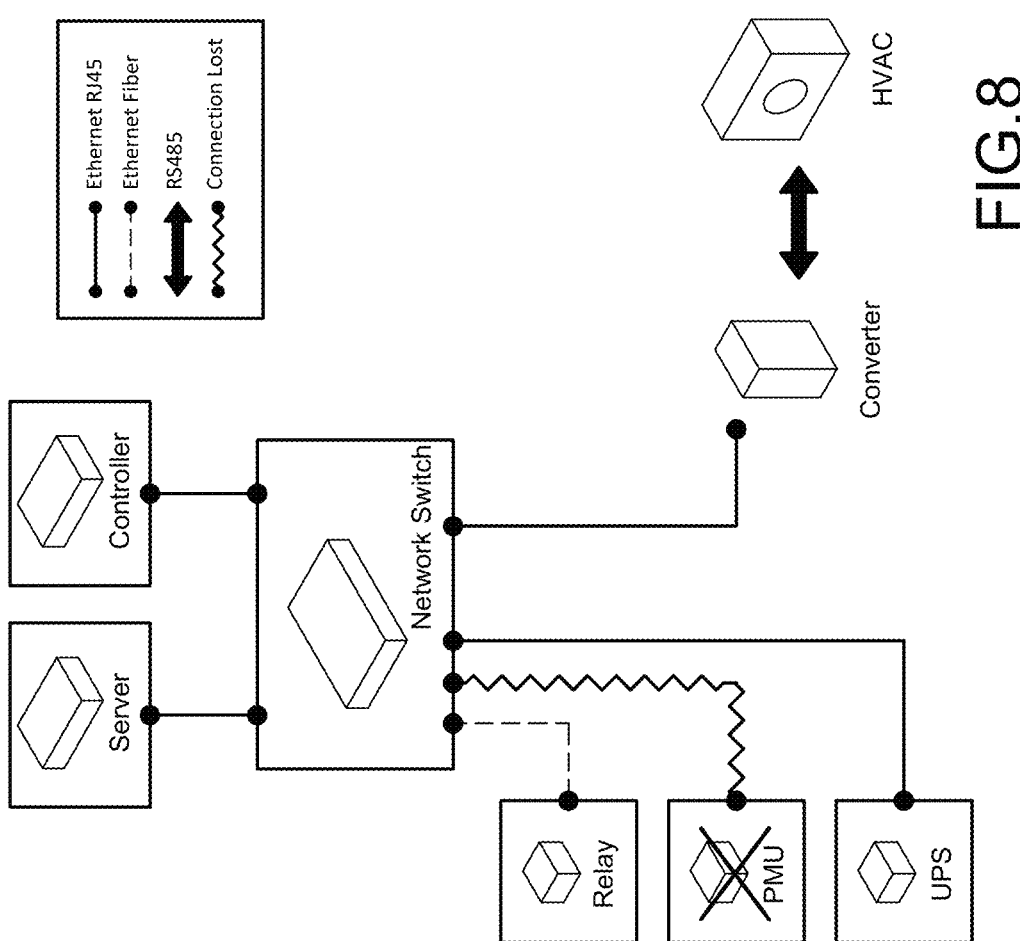

Please refer to FIG. 7 and FIG. 8, wherein FIG. 7 is a third schematic diagram of the graphic control page of the present disclosure and FIG. 8 is a fourth schematic diagram of the graphic control page of the present disclosure. FIG. 7 illustrates the connection structure displaying area 111 and the communication protocol displaying area 112 of the graphic control page 11, wherein the graphic control page 11 utilizes different colors and/or different streak lines to display different communication protocols (such as Ethernet RJ45, Ethernet Fiber, No Monitoring, and RS485, etc.) used between each peripheral device (such as Servers, Controllers, Relays, PMUs, and UPSs, etc.) and the network switch 2 and the connection status of each peripheral device.

FIG. 8 represents the connection structure displaying area 111, the communication protocol displaying area 112, and the information card displaying area 113 of the graphic control page 11. As shown in FIG. 8, the graphic control page 11 utilizes different colors and/or different streak lines to display the communication protocols used between each peripheral device and the network switch 2 and the connection status of each peripheral device, wherein a color or a streak line representing an abnormal communication-line (e.g., connection lost) is included. Besides, the graphic control page 11 utilizes a special symbol (e.g., the X symbol) to represent the abnormal device connection of the peripheral device (such as PMU in FIG. 8).

In the scenario, if the user uses the HMI of the server to click the graphic control component representing the PMU, the device clicking model 17 of the diagnosing system triggers the information card displaying area 113 on the graphic control page 11, so that information of the PMU, such as the connection status, the basic data, the device place, and the disconnection time, etc. are displayed on the information card displaying area 113 of the graphic control page 11.

The diagnosing system and the diagnosing method of the present disclosure may diagnose the abnormal situation immediately while it occurs and display the diagnosing result through a visual manner, which is ease for the user to realize the causing reason for the faulty and proceed to eliminate the same.

What is claimed is:

1. A self-diagnosing system for connection status of devices, the self-diagnosing system connected with multiple peripheral devices for communication in an environment, the self-diagnosing system including a server, which includes a non-transitory storage medium, executing multiple computer-executable program codes of an application program to comprise:

a graphic control page;

a communication diagnosing model, configured to determine whether device data of each of the multiple peripheral devices is received;

a device communication-status identification model, configured to identify that a communication-line of a first device of the multiple peripheral devices is normal when the device data of the first device is received, and determine whether a connection status of the first device is a first category or a second category according to a target data relevant to connectivity of the first device, wherein the first category indicates that the communication-line of the first device and a device connection of the first device are normal and the second category indicates that the communication-line of the first device is normal but the device connection of the first device is abnormal, wherein the target data is a heartbeat of the first device, the device connection of the first device is determined to be normal when the heartbeat changes overtime in a standard, and the device connection of the first device is determined to be abnormal when no variation of the heartbeat is determined;

a communication-line identification model, configured to identify that a second device of the multiple peripheral devices is offline when the device data of the second device is not received, and determine whether the connection status of the second device is the second category or a third category through inspecting the communication-line of the second device, wherein the third category indicates that the communication-line of the second device and the device connection of the second device are abnormal; and a graphic updating model, configured to update a displaying icon of each of the multiple peripheral devices on the graphic control page based on the connection status of each of the multiple peripheral devices;

wherein the graphic control page comprises:

a connection structure displaying area, configured to display a connection structure of the multiple peripheral devices;

a communication protocol displaying area, configured to display communication protocols utilized between each of the multiple peripheral devices and a network switch; and an information card displaying area, configured to display basic data, the connection status, and a disconnection time of a third peripheral device of the multiple peripheral devices being clicked on the connection structure displaying area, wherein the connection structure displaying area, the communication protocol displaying area, and the information card displaying area are provided separately and not overlapping with each other;

wherein the self-diagnosing system further comprises a device clicking model, configured to trigger the information card displaying area when the third peripheral device being clicked is detected;

wherein each of the communication protocols represents a single hardware connection protocol of a physical layer of open system interconnection reference model (OSI).

2. The self-diagnosing system in claim 1, further comprising a device-communication receiving model, configured to traverse the multiple peripheral devices and respectively receive the device data from each of the peripheral devices.

3. The self-diagnosing system in claim 1, wherein the communication-line identification model is configured to inspect pins of the second device via the communication protocol of the second device or read a status of communication ports of the second device through a network switch connected with the second device to check whether the communication-line of the second device is normal or abnormal.

4. The self-diagnosing system in claim 1, further comprising a data register wherein the device communication-status identification model and the communication-line identification model are configured to write the connection status of each of the peripheral devices to the data register, and the graphic updating model is configured to read the connection status of each of the peripheral devices from the data register.

5. The diagnosing system in claim 1, wherein the displaying icon comprises different colors to represent different connection statuses and a special symbol to represent an abnormal device connection of each of the peripheral devices.

6. A self-diagnosing method for connection status of devices, incorporated with a self-diagnosing system connected with multiple peripheral devices for communication in an environment, comprising:

step a) determining, by the self-diagnosing system, whether receiving a device data of each of the multiple peripheral devices;

step b) identifying, by the self-diagnosing system, that a communication-line of a first device of the multiple peripheral devices is normal when the device data of the first device is received;

step b1) after the step b), determining whether a connection status of the first device is a first category or a second category according to a target data relevant to connectivity of the first device, wherein the first category indicates that the communication-line of the first device and a device connection of the first device are normal and the second category indicates that the communication-line of the first device is normal but the device connection of the first device is abnormal, wherein the target data is a heartbeat of the first device, the device connection of the first device is determined to be normal when the heartbeat changes overtime in a standard, and the device connection of the first device is determined to be abnormal when no variation of the heartbeat is determined;

step c) identifying, by the self-diagnosing system, that a second device of the multiple peripheral devices is offline when the device data of the second device is not received;

step c1) after the step c), determining whether the connection status of the second device is the second category or a third category through inspecting the communication-line of the second device, wherein the third category indicates that the communication-line of the second device and the device connection of the second device are abnormal; and step d) updating, by the self-diagnosing system, a displaying icon of each of the multiple peripheral devices on a graphic control page of the self-diagnosing system based on the connection status of each of the multiple peripheral devices;

wherein the graphic control page comprises:

a connection structure displaying area for displaying a connection structure of the multiple peripheral devices;

a communication protocol displaying area for displaying communication protocols utilized between each of the multiple peripheral devices and a network switch; and an information card displaying area for displaying basic data, the connection status, and a disconnection time of a third peripheral device of the multiple peripheral devices being clicked on the connection structure displaying area, wherein the connection structure displaying area, the communication protocol displaying area, and the information card displaying area are provided separately and not overlapping with each other;

wherein the information card displaying area is triggered when the third peripheral device being clicked on the connection structure displaying area is detected;

wherein each of the communication protocols represents a single hardware connection protocol of a physical layer of open system interconnection reference model (OSI).

7. The self-diagnosing method in claim 6, wherein the step c1) comprises inspecting pins of the second device via the communication protocol of the second device or reading a status of communication ports of the second device through a network switch connected with the second device to check whether the communication-line of the second device is normal or abnormal.

8. The self-diagnosing method in claim 6, wherein the self-diagnosing system comprises a data register, and the self-diagnosing method further comprises:

step e) after the step b1), writing the connection status of the first device to the data register; and step f) after the step c1), writing the connection status of the second device to the data register;

wherein, the step d) comprises reading the connection status of each of the peripheral devices from the data register.

9. The self-diagnosing method in claim 6, wherein the displaying icon comprises different colors to represent different connection statuses and a special symbol to represent an abnormal device connection of each of the peripheral devices.

10. A non-transitory storage medium, storing an application program, wherein the application program comprises multiple computer-executable program codes, and the multiple computer-executable program codes are executed to implement the self-diagnosing method in the claim 6.

* * * * *